(12) United States Patent
Buesser et al.

(10) Patent No.: US 11,620,493 B2
(45) Date of Patent: Apr. 4, 2023

(54) INTELLIGENT SELECTION OF TIME SERIES MODELS

(71) Applicant: INTERNATIONAL BUSINESS MACHINES CORPORATION, Armonk, NY (US)

(72) Inventors: Beat Buesser, Ashtown (IE); Bei Chen, Blanchardstown (IE); Kelsey Dipietro, Milwaukee, WI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 711 days.

(21) Appl. No.: 16/594,549

(22) Filed: Oct. 7, 2019

(65) Prior Publication Data

US 2021/0103795 A1    Apr. 8, 2021

(51) Int. Cl.
| | |
|---|---|
| *G06N 3/04* | (2023.01) |
| *G06N 3/044* | (2023.01) |
| *G06N 20/00* | (2019.01) |
| *G06N 3/08* | (2023.01) |
| *G06N 3/045* | (2023.01) |

(52) U.S. Cl.
CPC ............. *G06N 3/044* (2023.01); *G06N 3/045* (2023.01); *G06N 3/08* (2013.01); *G06N 20/00* (2019.01)

(58) Field of Classification Search
USPC ............................ 704/202, 232, 259; 706/15
See application file for complete search history.

(56) References Cited

U.S. PATENT DOCUMENTS

| | | | |
|---|---|---|---|
| 7,877,338 B2 | 1/2011 | Tani et al. | |
| 10,169,656 B2 | 1/2019 | Song et al. | |
| 10,936,947 B1* | 3/2021 | Flunkert | G06N 3/0445 |
| 2006/0241923 A1 | 10/2006 | Xu et al. | |
| 2015/0254554 A1 | 9/2015 | Kato | |
| 2016/0171037 A1 | 6/2016 | Mathur et al. | |
| 2017/0091615 A1* | 3/2017 | Liu | G06N 3/0445 |
| 2017/0177411 A1 | 6/2017 | Thomas | |
| 2018/0039239 A1 | 2/2018 | Burchard | |
| 2018/0165604 A1 | 6/2018 | Minkin et al. | |
| 2018/0314978 A1 | 11/2018 | Kajino | |

(Continued)

FOREIGN PATENT DOCUMENTS

CN          104899658 A         9/2015

OTHER PUBLICATIONS

Time series model for predicting dropout in massive open online courses /Tang et al./ Artificial Intelligence in Education. 19th International Conference AIED 2018; 2018; Publisher: Springer International Publishing; Country of Publ.: Switzerland; ISBN: 9783319938455; Database: INSPEC/(5 Pages).

*Primary Examiner* — Leonard Saint-Cyr
(74) *Attorney, Agent, or Firm* — Griffiths & Seaton PLLC

(57) ABSTRACT

Various embodiments are provided for intelligent selection of time series models by one or more processors in a computing system. Time series data may be received from a user, one or more computing devices, sensors, or a combination thereof. One or more optimal time series models may be selected upon using and/or evaluating one or more recurrent neural networks models that are trained or pre-trained using simulated time series data or historical time series data, or a combination thereof for one or more predictive analytical tasks relating to the received time series data.

17 Claims, 9 Drawing Sheets

(56) References Cited

U.S. PATENT DOCUMENTS

| | | | |
|---|---|---|---|
| 2019/0087720 A1* | 3/2019 | Chakraborty | G06N 3/0445 |
| 2020/0065213 A1* | 2/2020 | Poghosyan | G06F 11/3452 |
| 2020/0242483 A1* | 7/2020 | Shashikant Rao | G06N 5/022 |
| 2020/0387797 A1* | 12/2020 | Ryan | G06F 11/3006 |

* cited by examiner

INTELLIGENT SELECTION OF TIME SERIES MODELS

BACKGROUND OF THE INVENTION

Field of the Invention

The present invention relates in general to computing systems, and more particularly to, various embodiments for intelligent selection of time series models in a computing system using a computing processor.

Description of the Related Art

Computing systems may be found in the workplace, at home, or at school. Due to the recent advancement of information technology and the growing popularity of the Internet, a wide variety of computer systems have been used in machine learning. Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research is to automatically learn to recognize complex patterns and make intelligent decisions based on data.

SUMMARY OF THE INVENTION

Various embodiments for intelligent selection of time series models by one or more processors in a computing system, are provided. In one embodiment, by way of example only, a method for implementing intelligent selection of time series models in a computing system, again by a processor, is provided. Time series data may be received from a user, one or more computing devices, sensors, or a combination thereof. One or more optimal time series models may be selected upon using and/or evaluating one of more recurrent neural networks models that are trained or pre-trained using simulated time series data or historical time series data, or a combination thereof for one or more predictive analytical tasks relating to the received time series data.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
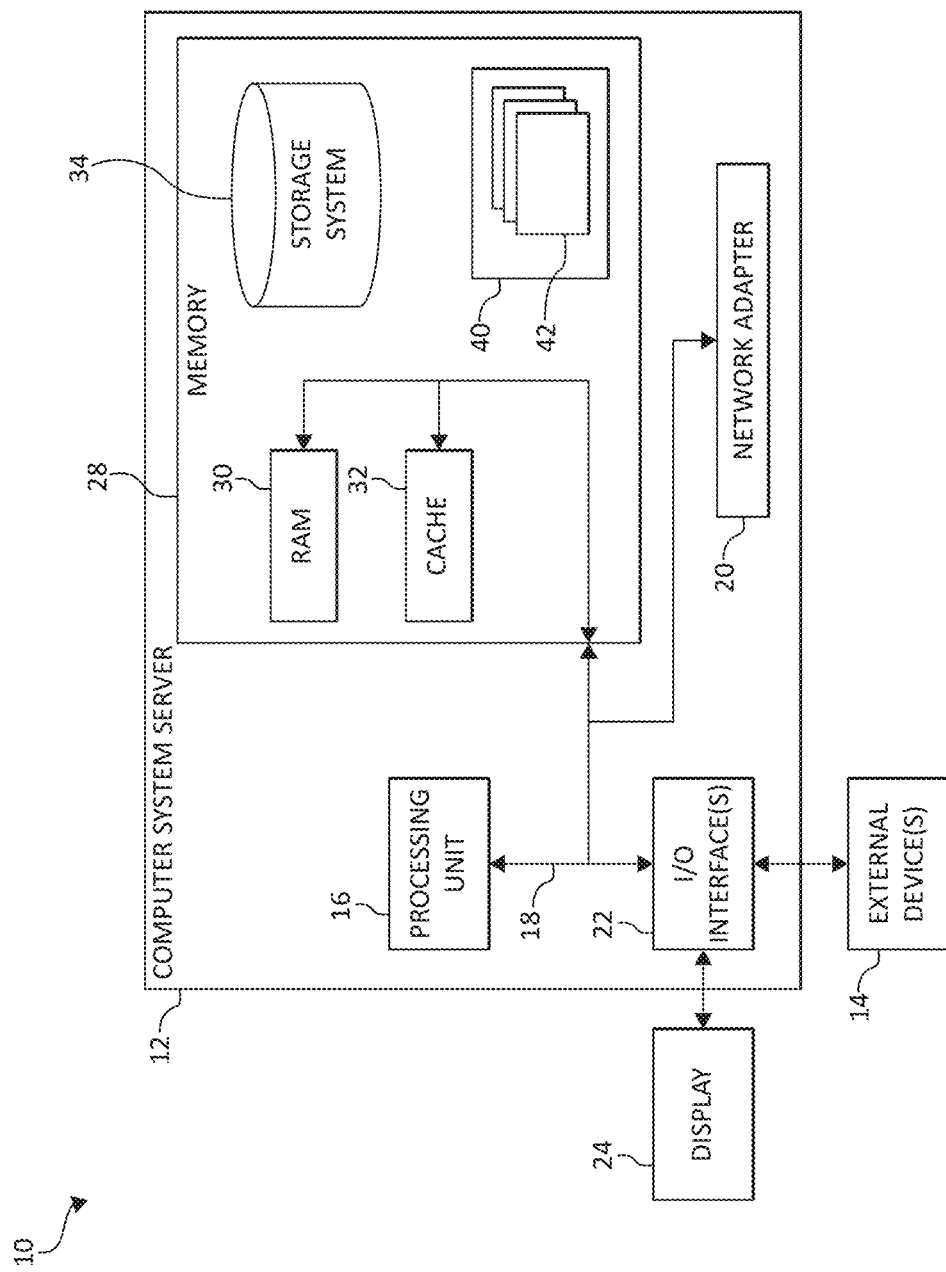
FIG. 1 is a block diagram depicting an exemplary cloud computing node according to an embodiment of the present invention.

Time-series data is generated in many systems and often forms the basis for forecasting and predicting future events in these systems. For example, in a data-center, a monitoring system could generate tens to hundreds of thousands of time-series data, each representing the state of a particular component (e.g., CPU and memory utilization of servers, bandwidth utilization of the network links, etc.). Auto-Regressive Integrated Moving-Average ("ARIMA") is a class of statistical models used for modeling time-series data and forecasting future values of the time-series. Such modeling and forecasting can then be used for predicting events in the future and taking proactive actions and/or for detecting abnormal trend.

Moreover, time series data is an important data formats. Time series analytics is crucial in various types of industries such as, for example in the financial, internet of things ("IoT"), and/or technical industries. Time series may be noisy and complex and require large datasets, significant amount of time and expertise to train meaningful models, if possible. Thus, the present invention provides for selecting traditional time series models (e.g., seasonal autoregressive integrated moving average "SARIMA" and/or generalized autoregressive conditional heteroscedasticity "GARCH", etc.).

Thus, the present invention provides for using a combination of computers, graphics processing units ("GPUs"), application-specific integrated circuits (ASICs), one or more network connections, storage devices, recurrent neural networks, and model databases. In one aspect, the present invention takes raw or transformed (e.g., differencing, logarithm, Fourier transform, etc.) time series data as input from a user/entity (e.g., human or business) and/or sensor (e.g., a machine or Internet of Things 'IoT' device/sensor) and selects one or more optimal time series models by evaluating one or multiple recurrent neural networks and return the fitted time series model to a user. The recurrent neural networks can be trained on 1) synthetic (e.g., simulated) data of time series generated from known processes with a variation of error functions (e.g., normal, student-t, Weibull, etc.), 2) historical time series data, 3) time series data uploaded by a user to focus on application specific time series data.

Additionally, in incoming time series data may be stored in data storage. Fitted time series models may be stored in model storage. A message interface may be used to notify a user of the outcome (e.g., a predicted traditional time series analytics model). User feedback may be collected on the nature of the data or constraints including, but not limited to, the nature of the data, computational constraints, and/or the targeted use of the model, etc.

It should be noted that a time series model may be applied to the time series data in order to generate a fitted model. A time series model described the data generating process. A fitted time series model may result from applying a time series model to specific time series data. Model parameter estimates may be optimized to fit the time series data based on a time series and a time series model. The fitted model may be used to forecast the time series.

In an additional aspect, the mechanisms of the illustrated embodiments provide novel approaches selecting time series models in a computing environment. In one aspect, one or multiple neural networks may be pretrained on existing and synthetic time series datasets on classifying traditional time series analytics models (e.g., SARIMA, GARCH, etc.) and their optimal model orders. The present invention takes one or multiple, unseen time series metadata on a user dataset, which describes an application, and generating the time series data (e.g., financial, IoT, sensor, etc.) as inputs. Synthetic training datasets may be provided and designed to cover 1) ranges of parameters in linearity (e.g., linear/non-linear and in-between), a 2) ranges of temporal dependence, seasonality (multiple seasonality types and their combinations), 3) existing time series models (e.g., ARIMA), deterministic/stochastic trends, and/or Bayesian mixture models, etc. In an additional aspect, the present invention may execute/run locally on a computer and/or may be provided as a service running on servers in a cloud computing platform.

In an additional aspect, the present invention may clean data in a preprocessing operation/step. One step of the preprocessing operation may include applying a special neural network for detecting and aligning shifts in time series. The present invention enables an additional/another neural network to fill missing data points and/or flagging and handling outliers. The present invention may analyze/checks the performance of a predicted model and/or provide predictions of the created traditional time series analytics mode to clients.

Furthermore, the present invention provides a definition of model orders of traditional time series analytics for model orders for Autoregressive Moving Average (ARMA) type models where: $\{y_1, \ldots, y_t\}$ is T observations from $\{Y_T\}$. Considering an ARMA(p, q) process $\{Y_T, t \in z\}$, $t \varepsilon$ $\mathbb{Z}$ satisfying the following equation:

$$\phi(L)Y_T = \theta(L)\varepsilon_t \quad (1),$$

where $\varepsilon_t$ are independently identically distributed ("i.i.d") random variables with $E(\varepsilon_t)=0$ and $E(\varepsilon_t^2)=\sigma^2<\infty$, and $\phi(L)$ and $\theta(L)$ are polynomials of order p and q given by the following equations:

$$\theta(L)=1-\Sigma_{i=1}^p \phi_i L \quad (2), \text{ and}$$

$$\theta(L)=1+\Sigma_{j=1}^p \theta_j L^j \quad (3),$$

with roots outside the unit circle, for p, q≥1 and L being the lag operator where $LY_t = LY_{t-1}$. In practice, the model orders p and q may be unknown and need to be estimated from a sample of observations by a domain expert. It should be noted that the ARMA(p, q) model takes into account the past p lagged value into the current timestamp. In one aspect, the present invention may be using recurrent neural networks ("RNNs") to completely automate the above mention operations/work and provide domain expert level accuracy as a service.

Thus, the present invention enables rapid creation of optimal and efficient traditional time series models for predictive analytics tasks, which operations may be served and scaled through cloud platforms as a service. The present invention provides for automating traditional time series analytics for large amounts of time series data and completely automates the process of traditional time series analysis model selection. The present invention may avoid repeated manual model parameter estimations and minimizes/eliminates human bias in the model selection process. Additionally, the present invention maintains/keeps selection standards constant across multiple analyses and multiple time series datasets and applications.

It should be noted that one or more calculations may be performed using various mathematical operations or functions that may involve one or more mathematical operations (e.g., performing rates of change/calculus operations, solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, "optimize" may refer to and/or defined as "maximize," "minimize," or attain one or more specific targets, objectives, goals, or intentions. Optimize may also refer to maximizing a benefit to a user (e.g., maximize a machine learning model benefit). Optimize may also refer to making the most effective or functional use of a situation, opportunity, or resource.

Additionally, "optimize" need not refer to a best solution or result but may refer to a solution or result that "is good enough" for a particular application, for example. In some implementations, an objective is to suggest a "best" combination of machine learning models, but there may be a variety of factors that may result in alternate suggestion of a combination of machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
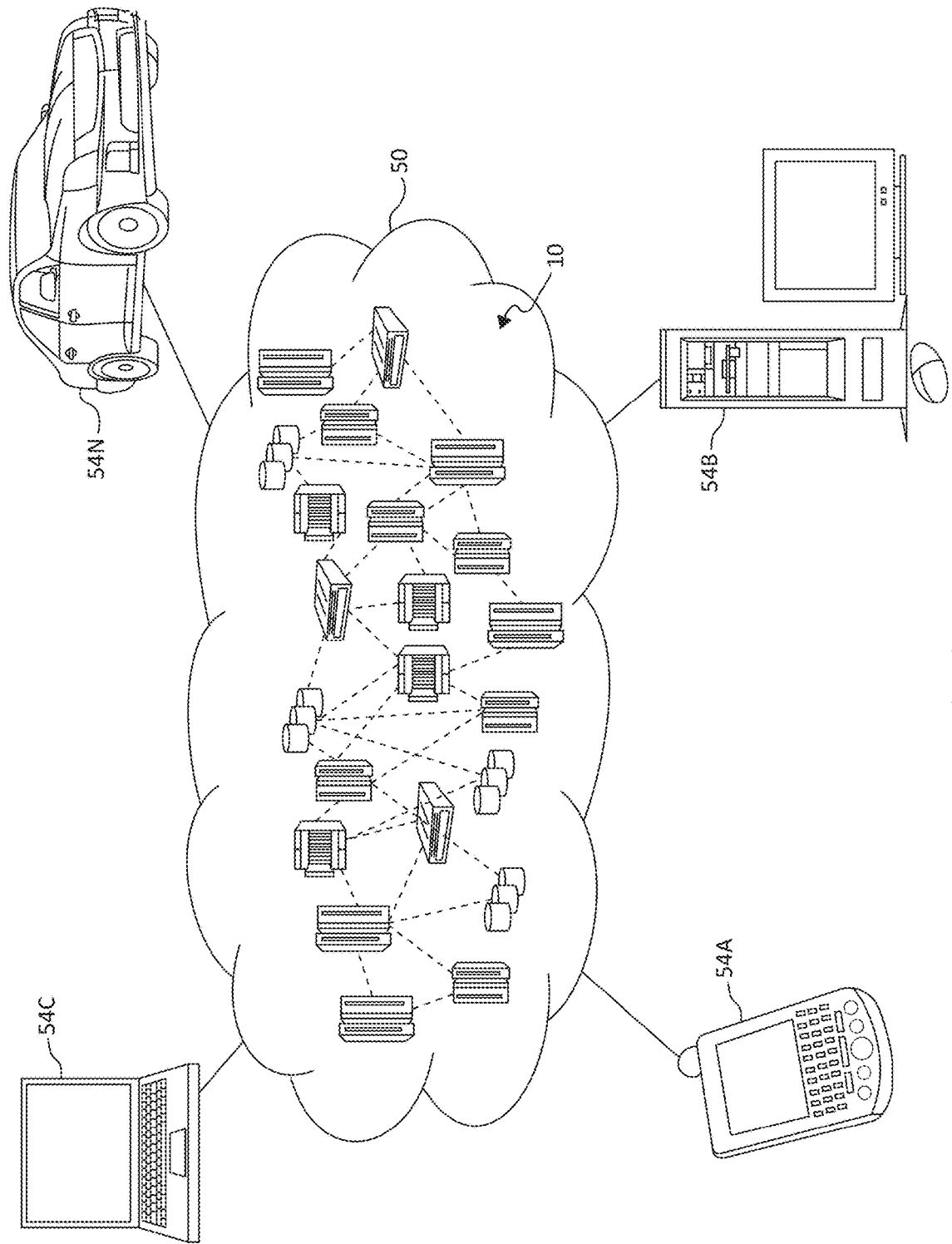
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
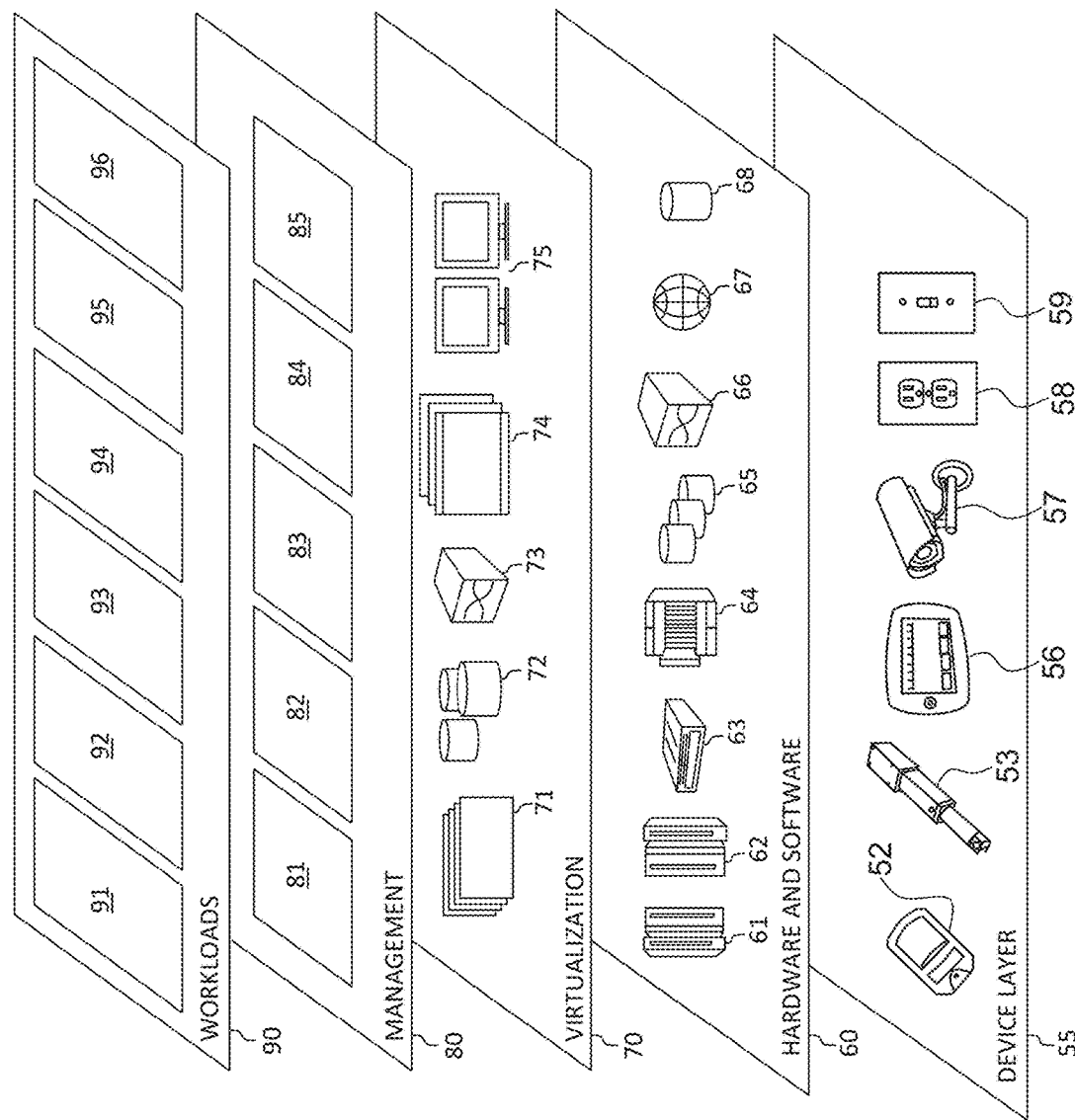
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for decentralized distributed deep learning. In addition, workloads and functions 96 for decentralized distributed deep learning may include such operations as analytics, entity and obligation analysis, and as will be further described, user and device management functions. One of ordinary skill in the art will appreciate that the workloads and functions 96 for decentralized distributed deep learning may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
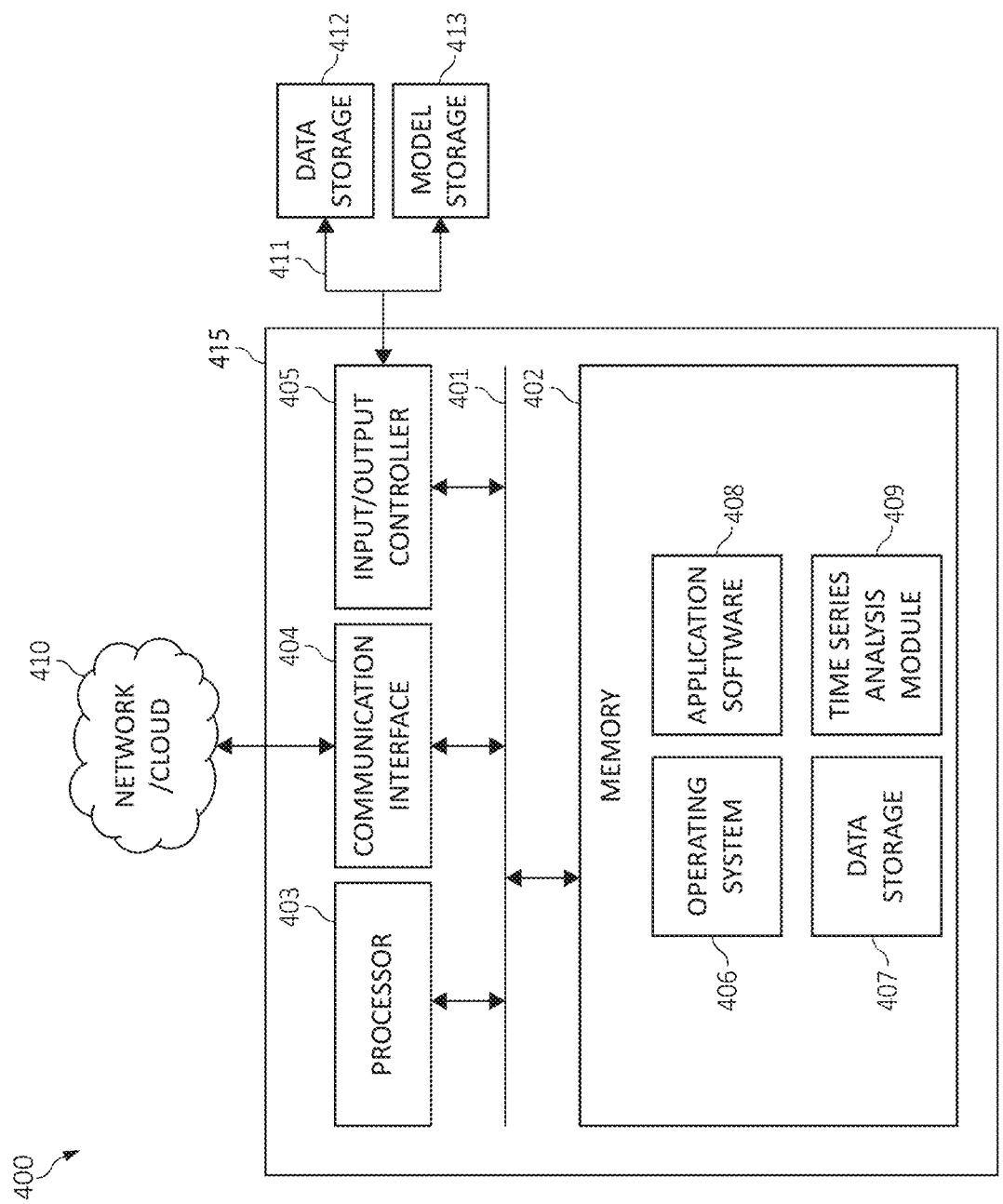
FIG. 4 is an additional block diagram depicting system architecture for intelligent selection of time series models in accordance with another embodiment of the present invention.

FIG. 4 is a functional block diagram depicting a deep learning system 400 in accordance with some embodiments of the present invention.

Turning to FIG. 4, a block diagram of various functionality for an system 400 for intelligent selection of time series models with various functionality as will be further described is shown in which aspects of the mechanisms of the illustrated embodiments may be realized. In one aspect, one or more of the components, modules, services, applications, and/or functions described in FIGS. 1-3 may be used in FIG. 4.

For example, a time series analysis system 415 may be and/or use computer system/server 12 of FIG. 1 and may be connected to other computing nodes (such as computer systems of vehicles) over a distributed computing network, where additional data collection, processing, analytics, and other functionality may be realized. The time series analysis system 415 (e.g., an artificial intelligent "AI" computer system), may include a bus system 401, a system memory 402, and processing unit 403 to operate the time series analysis system 415.

The time series analysis system 415 may also include a communication interface 404 to accept incoming time series data for analysis and return outgoing data about the created traditional time series model. The time series analysis system 415 may an input/output controller 405 to connect with storage such as, for example data storage 412 and model storage 413. In one aspect, connection 111 provides connection to and/or access to 1) the data storage 412 to store time series data and metadata, and/or 2) the model storage 413 to store predicted traditional time series analysis models.

The system memory 402 may include an operating system ("OS") 406, an in-memory data storage 407, an application software 408, and a time series analysis module 409 that may include pre-trained recurrent neural networks.

The time series analysis system 415 may be connected to and/or in association with a network/cloud 410 to connect with one or more users.

Thus, using time series analysis system 415, time series data may be received from a user, one or more computing devices, sensors, or a combination thereof. One or more optimal time series models may be selected upon using and/or evaluating one or more recurrent neural networks models that are trained or pre-trained using simulated time series data or historical time series data, or a combination thereof for one or more predictive analytical tasks relating to the received time series data.

Figure 5:
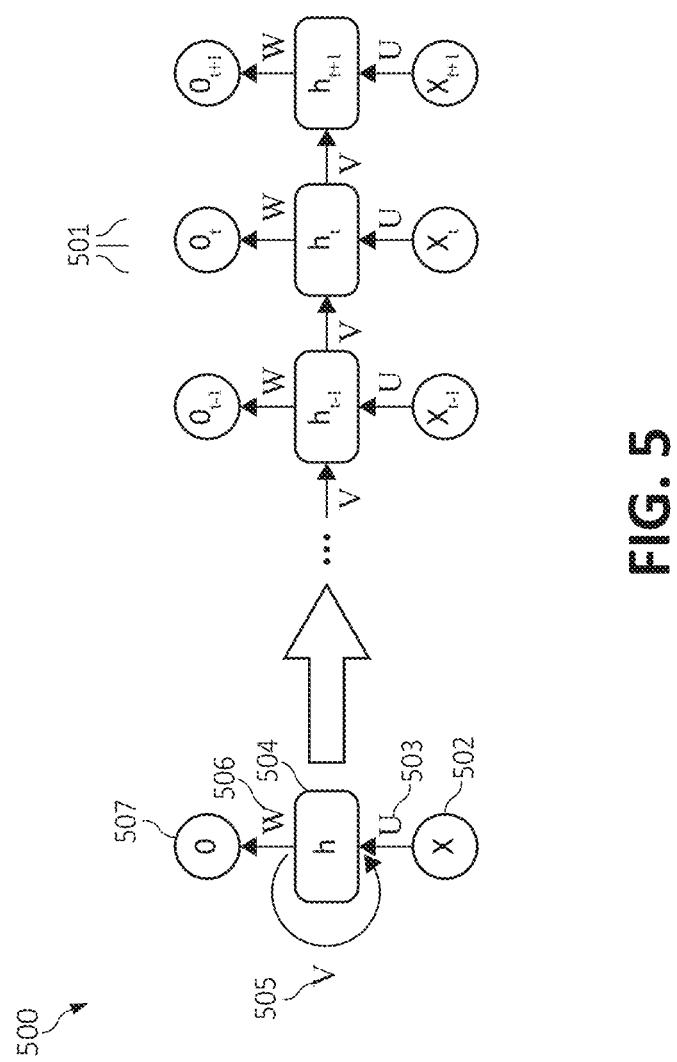
FIG. 5 is an additional block diagram depicting an exemplary representation of a recurrent neural network ("RNN") in accordance with aspects of the present invention.

Turning now to FIG. 5, block diagram depicts an exemplary representation of a recurrent neural network ("RNN") 500. In one aspect, one or more of the components, modules, services, applications, and/or functions described in FIGS. 1-4 may be used in FIG. 5. Repetitive description of like elements, components, modules, services, applications, and/ or functions employed in other embodiments described herein (e.g., FIGS. 1-4) is omitted for sake of brevity.

In one aspect, the RNN 500 may be a network of neuron-like nodes organized into successive layers where each node in a selected layer may be connected with a directed (e.g., "one-way") connection to every other node in the next successive lawyer. Each node (neuron) may include a time-varying real-valued activation. Each connection (e.g., "synapse") may include a modifiable weight. In one aspect, each of the nodes may be 1) input nodes (receiving data from outside the network), 2) output nodes (yielding results), and/or 3) hidden nodes (that modify the data en-route from input to output).

The RNN 500 shows recurrent connections between time steps to memorize what has been calculated so far in the network, where the variables x, h, and o are input, hidden, output, respectively. In RNN 500, there is a recurrent connection of hidden-to-hidden itself via weight matrix W and the information that captures the computation history is passed through this connection.

Rearranging, RNN 500, RNN 501 is now depicted as a feedforward network by unfolding it over the time. In one aspect, the RNN 501 is an unfolded representation of the RNN 500. In operation, input data 502 in the form of a time series or series of data points may be provide as input into the RNN 500. A weight matrix 503 ("U") may be used for multiplying the input data 502. A hidden state 504 ("h") may be used and represented by a vector or matrix equal to the sum after multiplications of the weight matrix 503 and the weight matrix 505 ("V"). The weight matrix 505 ("V") may be used for multiplying the hidden state 504 ("h"). The weight matrix 506 ("W") may be used for multiplying the hidden state 504 ("h"). An output 207 ("o") may be generated and correspond to the result of multiplication in weight matrix 506 ("W").

Figure 6:
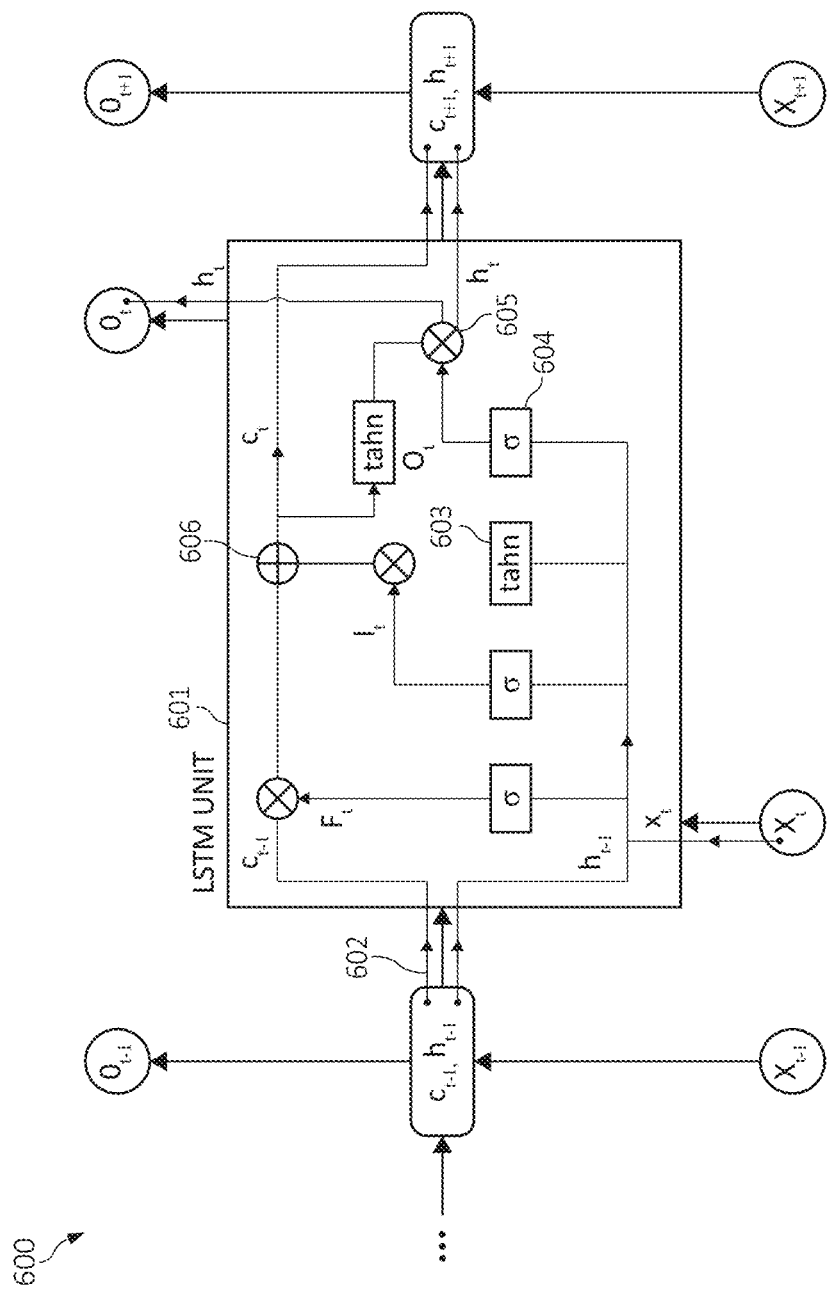
FIG. 6 is an additional block diagram depicting an exemplary representation of a long short term model ("LSTM") in accordance with aspects of the present invention.

FIG. 6 is an additional block diagram depicting an exemplary representation of a long short term model ("LSTM") 600. The LSTM 600 is a variation of RNN 500 in an unfolded schematic representation, which adds a memory block in an RNN node with input gate activation function, output gate activation function and forget gate activation function resulting in a gating memory that allows the network to retain some information for a longer period of time. Said differently, the LSTM 600 utilizes loops to allow information to persist, and enabling long-term dependencies. The loops can be thought of as multiple copies of the neural network, each passing previously obtained information (memory) to a successor.

The LSTM 600 may utilizes four layers in which the vectors of information are connected from outputs of one node to the inputs of others, and includes pointwise operations. A cell state propagates through the chain of layers and utilizes gates to add or remove information to the cell state comprised of a sigmoid neural net layer and multiplication operation. Performing operations on the old cell state determines a degree of update to new candidate values of the new cell state. Filters may be applied to output determined parts of the new cell state. Thus, the LSTM 600 is a state preserving mechanism through built-in memory cells (e.g., a LSTM cell 601), where $C_t$ is a cell state vector, $h_t$ is a hidden state vector (e.g., an output vector of the LSTM cell 601), $O_t$ is an output gate's activation vector, $i_t$ is an input/update gate's activation vector, $f_t$ is a forgot gate's activation vector, and $X_t$ is an input vector to the LSTM cell 601.

In one aspect, by way of example only, the LSTM 600 includes the LSTM cell 601 (e.g., "LSTM unit"). The LSTM cell 601 may receive one or more recurrent information streams which may then trigger one or more activation steps such as, for example a tanh function 603 and/or a sigmoid (a) function 604. The LSTM cell 601 may perform a multiplication step 605 and a summation step 606. Thus, the LSTM 600 can learn tasks that require memories of events that happened one or more discrete time steps previously (e.g., millions of previous time steps) and may be used even with long delays between significant events and process signals that may be a mix of low and high frequency components.

Figure 7:
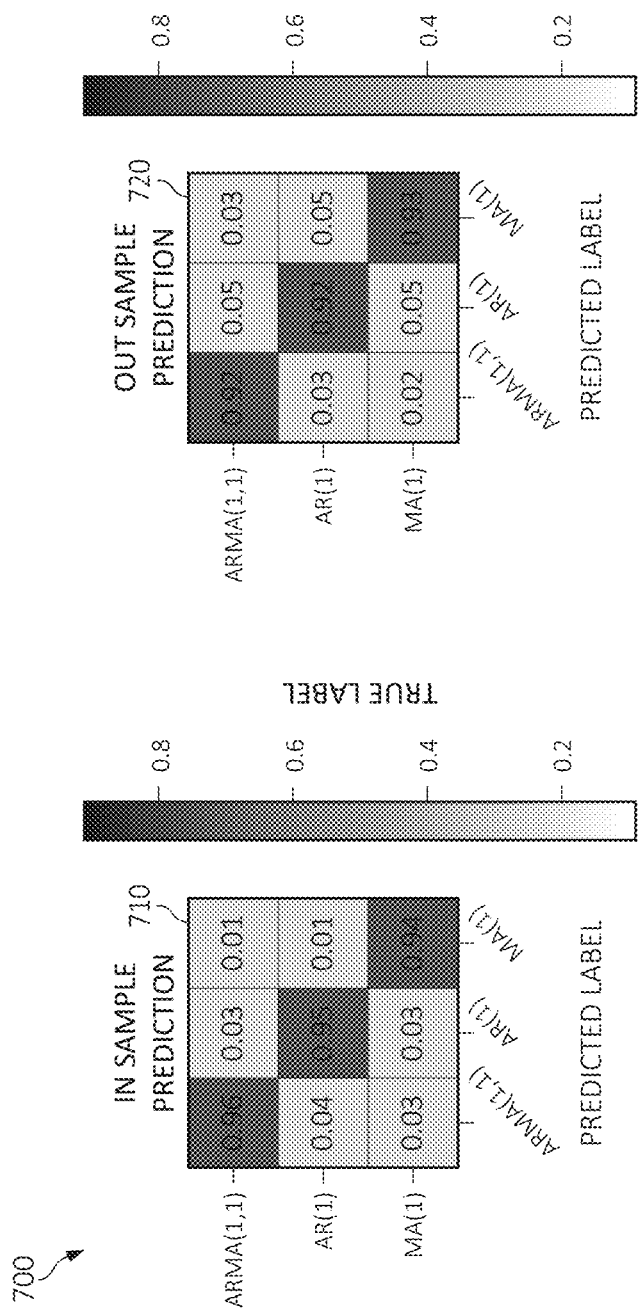
FIG. 7 is an additional block diagram depicting an exemplary classification accuracy using a time series analysis models using a recurrent neural network ("RNN") in accordance with aspects of the present invention.

Turning now to FIG. 7, block diagram 700 depicting exemplary classification accuracy using a time series analysis models using a recurrent neural network ("RNN"). That is, recurrent neural networks such as, for example, ARMA (1,1) model, AR (1) model, and MA (1) model depict increased great accuracy in classifying traditional time series analysis models. For example, as depicted in FIG. 7, the "in sample" prediction means a model is trained on the same set of data which it tries to predict and "out of sample" prediction means the model is trained on one set of data, while it predicts another set of data that does not belong to the data used for training the model. The diagonal boxes (e.g., darker shaded boxes) are examples of the model prediction accuracy of the illustrated embodiments described herein. The diagonal of the boxes show a percentage of correctly predicted models and the closer these percentages are to the variable one ("1"), the more accurate models are. The off-diagonal percentages (e.g., displayed as the lighter shaded boxes) depict/illustrate the wrongly predicted models.

Figure 8:
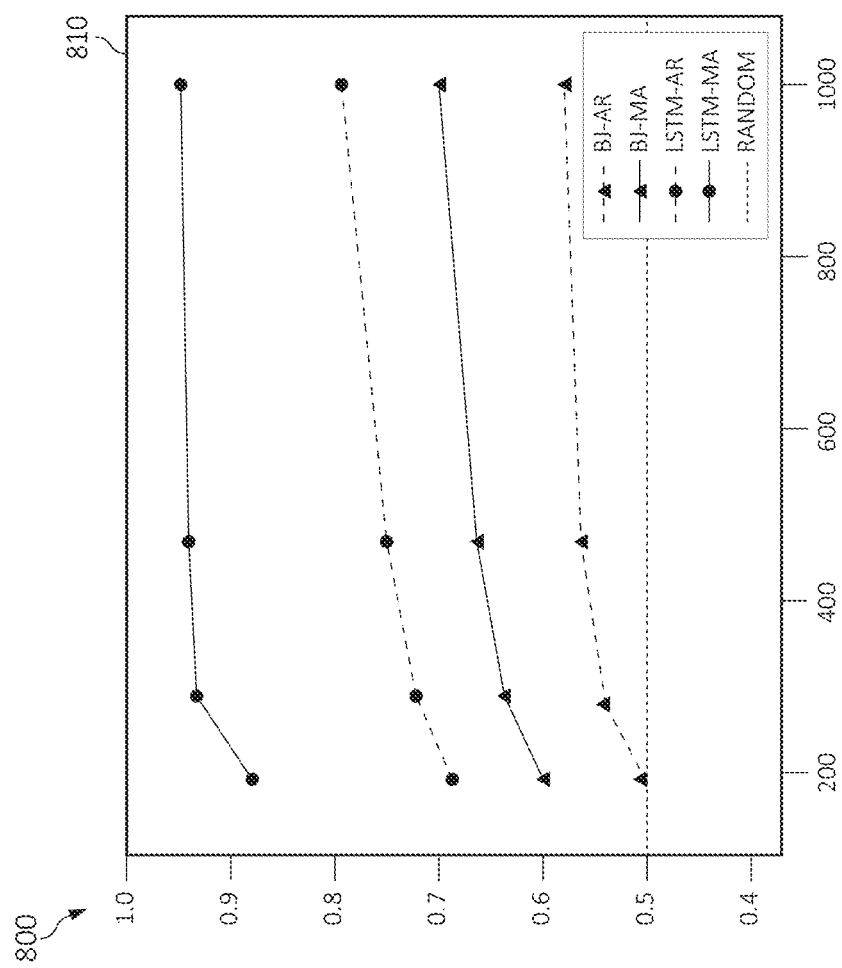
FIG. 8 is an additional block diagram depicting an exemplary prediction accuracy using a time series analysis models using a recurrent neural network ("RNN") in accordance with aspects of the present invention.

Turning now to FIG. 8, block diagram 800 depicts an exemplary prediction accuracy using a time series analysis models using a recurrent neural network ("RNN"). That is, a recurrent neural networks (e.g., RNN 500) illustrates increased/better performance in predicting traditional time series analysis models than traditional approaches (e.g., Box-Jenkins ("BJ")AR, and BJ-MA, LSTM-AR, LSTM-MA, and random), especially for smaller sample sizes, where the -axis is the accuracy of the time series model and the x-axis is the sample size.

Thus, FIGS. 7 and 8 illustrate the results of intelligent selection of time series models from taking raw or transformed (e.g., differencing, logarithm, Fourier transform, etc.) time series data as input from a user/entity (e.g., human or business) and/or sensor (e.g., a machine or Internet of Things 'IoT' device/sensor) and selecting one or more optimal time series models by evaluating one or multiple recurrent neural networks and return the fitted time series model. The recurrent neural networks can be trained on 1) synthetic (e.g., simulated) data of time series generated from known processes with a variation of error functions (e.g., normal, student-t, Weibull, etc.), 2) historical time series data, 3) time series data uploaded by a user to focus on application specific time series data.

Figure 9:
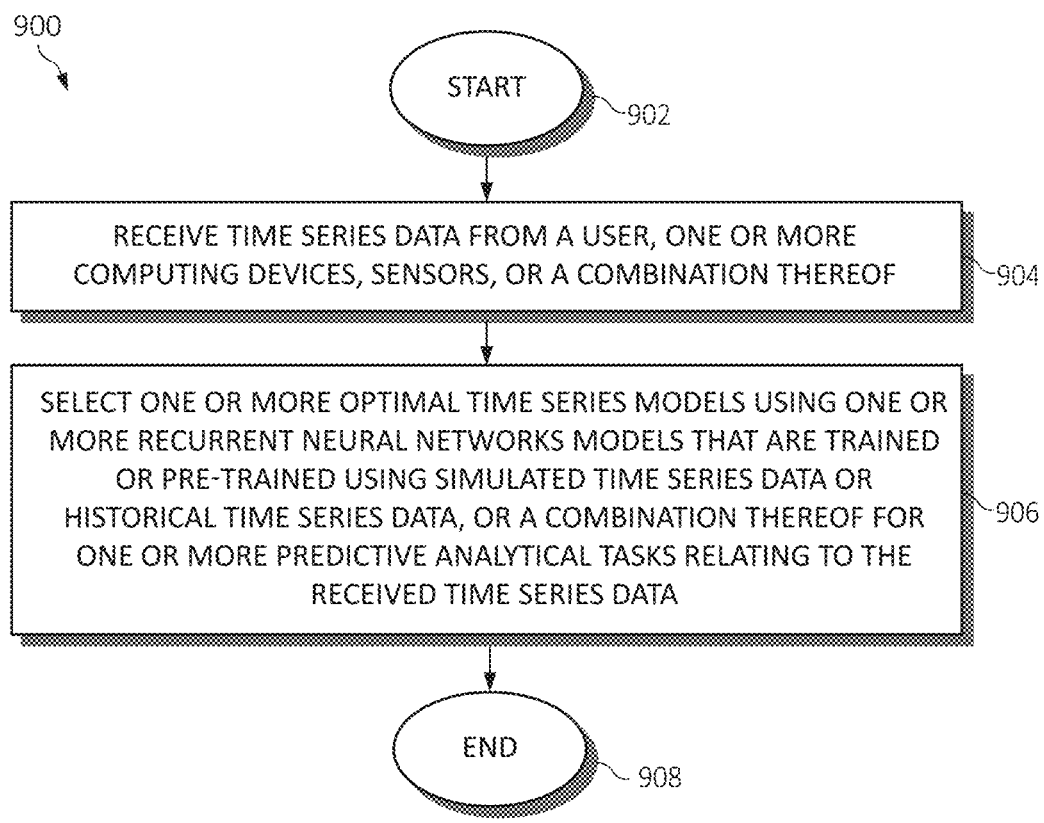
FIG. 9 is a flowchart diagram depicting an exemplary method for decentralized distributed deep learning in a computing environment according to an embodiment of the present invention by a processor, in which aspects of the present invention may be realized.

Turning now to FIG. 9, a method 900 for intelligent selection of time series models in a computing environment by a processor is depicted, in which various aspects of the illustrated embodiments may be implemented. That is, FIG. 9 is a flowchart of an additional example method 900 for intelligent selection of time series models in a computing environment according to an example of the present technology. The functionality 900 may be implemented as a method executed as instructions on a machine, where the instructions are included on at least one computer readable medium or one non-transitory machine-readable storage medium. The functionality 900 may start in block 902.

Time series data may be received from a user, one or more computing devices, sensors, or a combination thereof, as in block 904. One or more optimal time series models may be selected upon using and/or evaluating one or more recurrent neural networks models that are trained or pre-trained using simulated time series data or historical time series data, or a combination thereof for one or more predictive analytical tasks relating to the received time series data, as in block 906. The functionality 900 may end, as in block 908.

In one aspect, in conjunction with and/or as part of at least one block of FIG. 9, the operations of 900 may include each of the following. The operations of 900 may receive the time series data from a user, one or more computing devices, sensors, or a combination thereof, wherein the current time series data is transformed or untransformed data, and/or evaluate the one or more recurrent neural networks models using the time series data.

The operations of 900 may generate the simulated time series data from one or more selected operations each having a variation of one or more error functions for training the one or more recurrent neural networks models. The operations of 900 may store the time series data upon reception, and/or store the one or more time series models. The operations of 900 may collect feedback data relating to the one or more time series models, and/or restrict a weight from being updated at a selected node in the list of neighbor nodes when one or more weights are transmitted and averaged to maintain data consistency.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing intelligent selection of time series models in a computing environment by one or more processors comprising:
preprocessing time series data by applying a preprocessing neural network to the time series data to detect and align shifts in time series, wherein the preprocessing fills at least one of fills missing data points and flags outliers in the time series data; and
selecting, from a repository of time series models having been pre-trained by one or more recurrent neural networks using at least one of simulated time series data and historical time series data, one or more time series models to perform one or more predictive analytical tasks relating to time series data of an application, wherein selecting the one or more time series models includes receiving previously unseen time series metadata from a user dataset to generate the time series data as input, identifying optimal model orders of the one or more time series models using the one or more recurrent neural networks to automate the identifying, fitting the time series data to the selected one or more time series model using the optimal model orders, and returning the fitted one or more time series models.

2. The method of claim 1, further including receiving the time series data from a user, one or more computing devices, sensors, or a combination thereof, wherein the time series data is transformed or untransformed data.

3. The method of claim 1, further including evaluating the one or more recurrent neural networks models using the time series data.

4. The method of claim 1, further including generating the simulated time series data from one or more selected operations each having a variation of one or more error functions for training the one or more recurrent neural networks models.

5. The method of claim 1, further including:
storing the time series data upon reception; and
storing the one or more time series models.

6. The method of claim 1, further including collecting feedback data relating to the one or more time series models.

7. A system for intelligent selection of time series models in a computing environment, comprising:
one or more computers with executable instructions that when executed cause the system to:
preprocess time series data by applying a preprocessing neural network to the time series data to detect and align shifts in time series, wherein the preprocessing fills at least one of fills missing data points and flags outliers in the time series data; and
select, from a repository of time series models having been pre-trained by one or more recurrent neural networks using at least one of simulated time series data and historical time series data, one or more time series models to perform one or more predictive analytical tasks relating to time series data of an application, wherein selecting the one or more time series models includes receiving previously unseen time series metadata from a user dataset to generate the time series data as input, identifying optimal model orders of the one or more time series models using the one or more recurrent neural networks to automate the identifying, fitting the time series data to the selected one or more time series model using the optimal model orders, and returning the fitted one or more time series models.

8. The system of claim 7, wherein the executable instructions further receive the time series data from a user, one or more computing devices, sensors, or a combination thereof, wherein the time series data is transformed or untransformed data.

9. The system of claim 7, wherein the executable instructions further evaluate the one or more recurrent neural networks models using the time series data.

10. The system of claim 7, wherein the executable instructions further generate the simulated time series data from one or more selected operations each having a variation of one or more error functions for training the one or more recurrent neural networks models.

11. The system of claim 7, wherein the executable instructions further:
store the time series data upon reception; and
store the one or more time series models.

12. The system of claim 7, wherein the executable instructions further collect feedback data relating to the one or more time series models.

13. A computer program product for, by a processor, intelligent selection of time series models in a computing environment, the computer program product comprising a non-transitory computer-readable storage medium having computer-readable program code portions stored therein, the computer-readable program code portions comprising:
an executable portion that preprocesses time series data by applying a preprocessing neural network to the time series data to detect and align shifts in time series, wherein the preprocessing fills at least one of fills missing data points and flags outliers in the time series data; and
an executable portion that selects, from a repository of time series models having been pre-trained by one or more recurrent neural networks using at least one of simulated time series data and historical time series data, one or more time series models to perform one or more predictive analytical tasks relating to time series data of an application, wherein selecting the one or more time series models includes receiving previously unseen time series metadata from a user dataset to generate the time series data as input, identifying optimal model orders of the one or more time series models using the one or more recurrent neural networks to automate the identifying, fitting the time series data to the selected one or more time series model using the optimal model orders, and returning the fitted one or more time series models.

14. The computer program product of claim 13, further including an executable portion that:
receives the time series data from a user, one or more computing devices, sensors, or a combination thereof, wherein the time series data is transformed or untransformed data; or
evaluates the one or more recurrent neural networks models using the time series data.

15. The computer program product of claim 13, further including an executable portion that generates the simulated time series data from one or more selected operations each having a variation of one or more error functions for training the one or more recurrent neural networks models.

16. The computer program product of claim 13, further including an executable portion that:
stores the time series data upon reception; and
stores the one or more time series models.

17. The computer program product of claim 13, further including an executable portion that collects feedback data relating to the one or more time series models.

\* \* \* \* \*